United States Patent [19]

Duch et al.

[11] Patent Number: 5,987,024
[45] Date of Patent: Nov. 16, 1999

[54] SELF SYNCHRONIZING NETWORK PROTOCOL

[75] Inventors: Krzysztof Duch, Hoffman Estates; James J. Madon, Lisle; Ivan Vukovic, Schaumburg, all of Ill.

[73] Assignee: Motorola, Inc., Schaumburg, Ill.

[21] Appl. No.: 08/853,620

[22] Filed: May 9, 1997

[51] Int. Cl.$^6$ .................................................. H04J 3/06
[52] U.S. Cl. .................... 370/350; 370/503; 370/508; 370/519
[58] Field of Search .................... 370/503, 507, 370/508, 516, 509, 347, 348, 350, 442, 443, 445, 447, 230, 231, 232, 235, 277, 278, 279, 519; 455/518, 519

[56] References Cited

U.S. PATENT DOCUMENTS

| | | | |
|---|---|---|---|
| 4,253,181 | 2/1981 | Watten | 370/507 |
| 4,573,045 | 2/1986 | Galin | 370/447 |
| 4,888,763 | 12/1989 | Hatfield | 370/445 |
| 5,197,066 | 3/1993 | Sutterlin | 370/442 |
| 5,379,293 | 1/1995 | Konno et al. | 370/389 |
| 5,414,702 | 5/1995 | Kudoh | 370/395 |
| 5,745,484 | 4/1998 | Scott | 370/347 |

OTHER PUBLICATIONS

"Extended DQRAP (XDQRAP) A Cable TV Protocol Functioning as a Distributed Switch", by Chien–Ting Wu & Graham Campbell, Computer Science Dept. Illinois Institute of Technology.

*Primary Examiner*—Douglas W. Olms
*Assistant Examiner*—Kenneth Vanderpuye
*Attorney, Agent, or Firm*—Terri S. Hughes; Romi Bose

[57] ABSTRACT

A self synchronizing network protocol which allows networks to become self synchronizing. Two pairs of nodes communicate in an ad hoc packet radio network. Packets are communicated over a plurality of frames of time. A known bit field is appended to each packet. A clock at the first pair of nodes (10 and 12) is unavoidably slower than the clock at the second pair of nodes (14 and 16). As a result, packets transmitted from the second pair of nodes (14 and 16) will eventually overlap packets transmitted from the first pair of nodes (10 and 12). Errors in the appended field (17) can be used to detect such an overlap in advance to prevent damage to the payload. The protocol provides for additional channel efficiency, more responsiveness and the ability to grow without a central controller. Further, the ability to accommodate new traffic is increased.

31 Claims, 4 Drawing Sheets

SELF SYNCHRONIZING NETWORK PROTOCOL

FIELD OF THE INVENTION

This invention relates generally to a self synchronizing network protocol used, for example, in a wireless asynchronous transfer mode communications system.

BACKGROUND OF THE INVENTION

A non-synchronized distributed (ad hoc) packet radio network is a collection of wireless mobile devices forming a temporary network without the aid of any established infrastructure or centralized administration. These networks imply the absence of a central node or controller. There might exist a point where an ad hoc network is connected to a fixed network although this is not necessary. The situations where ad hoc networking is unavoidable include, but are not limited to, the following cases: a class of students exchanging files with their laptops or other portable wireless devices, business partners exchanging data at an airport or a team of rescue workers in the field trying to communicate with each other and the rest of the world.

In ad hoc packet radio networks, it is difficult to maintain a global clock due to lack of, for example, a periodic beacon. In order to transmit delay-sensitive traffic (jitter-sensitive traffic), a reservation mechanism is required. Reservations would imply sending packets equally spaced in time, i.e., $T_{frame}$ apart. Due to a limited accuracy of clocks in the nodes, the packets will have a tendency to overlap and become lost.

Centralized wireless network architectures in most cases have access points through which the mobile wireless users communicate between each other or with other users on the fixed (wired) network. The access points (or base stations) are in the position to provide synchronization (slot timing) to the mobile users through the use of, for example, periodic beacons. In mobile ad hoc networks, since there is no central node, obtaining and maintaining slot timing among distributed users is a more difficult problem. Having a common slot reference is a desired feature since it usually means improved throughput performance. Another desired feature is the ability to reserve a portion of the channel (i.e., one or more time slots) and use them periodically. This implies the existence of a frame period which is known to all participating wireless devices.

A representative protocol, which uses a frame structure, is the Reservation ALOHA random access scheme. In Reservation ALOHA the time horizon is divided into equal size frames and the frames are divided into equal numbers of time slots. In Reservation ALOHA, packets are sent only at the beginning of a slot. In an ad hoc network, which employs a channel access scheme similar to Reservation ALOHA (i.e., time division multiple access-like with contention), it is difficult to ensure that all nodes are slot synchronized. After a node obtains a position in the frame and continues to transmit periodically, it is possible that another packet will start to overlap due to inaccurate clocks at each node. This effect does not occur in slotted systems since the packets are confined to a single slot but will occur in ad hoc networks. In this document, we address a method which alleviates the problem of packet overlap created by inaccuracies of the clocks at each node in ad hoc networks.

A preferred embodiment of the invention is now described, by way of example only, with reference to the drawings.

BRIEF DESCRIPTION OF THE DRAWINGS

The features of the present invention are set forth with particularity in the appended claims. The invention itself, together with further features and attendant advantages, will become apparent from consideration of the following detailed description, taken in conjunction with the accompanying drawings. A preferred embodiment of the invention is now described, by way of example only, with reference to the accompanying drawings in which:

It will be appreciated that for simplicity and clarity of illustration, elements shown in the figures have not necessarily been drawn to scale. Where considered appropriate, reference numerals have been repeated among the figures to indicate corresponding elements.

DETAILED DESCRIPTION OF THE PREFERRED EMBODIMENT

Figure 1:
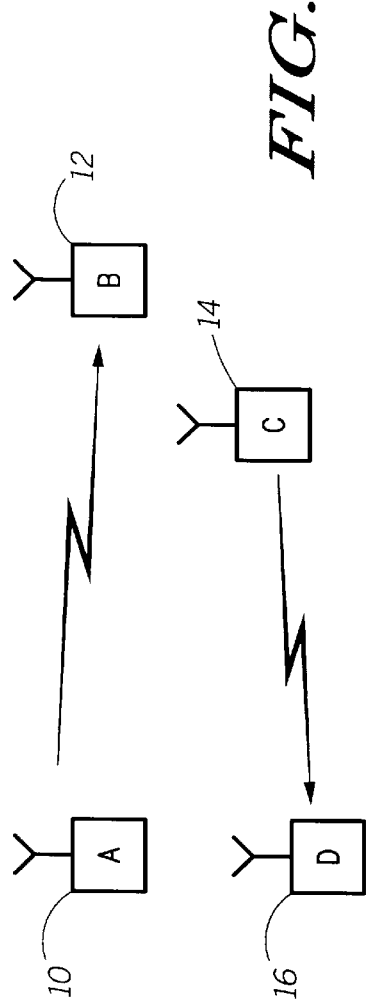
FIG. 1 is an overview of two pairs of nodes communicating according to a preferred embodiment of the invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the illustrated embodiments, and any additional applications of the principles of the invention as illustrated herein, which are equivalent or would normally occur to one skilled in the relevant art, are to be considered within the scope of the invention claimed.

The synchronizing network protocol discussed in detail below allows for networks to become self synchronizing. It provides for additional channel efficiency (due to reduced inter-packet gap), more responsiveness and the ability to grow without a central controller. The ability to accommodate new traffic is increased in either a simplex or duplex radio environment.

Self synchronizing networks allow for greater capacity in an ad hoc cable wireless network. Providing synchronization further allows the base and customer equipment to be manufactured at less cost as compared to adding a central controller. Self synchronization allows for a sizable increase in usable bandwidth (e.g., based on the comparison of slotted and un-slotted ALOHA, the increase in usable bandwidth is estimated at 50%).

FIG. 1 shows a scenario with two pairs of nodes communicating in an ad hoc packet radio network according to a preferred embodiment of the invention. The letter on each node identifies the node. As shown by the arrows, node A 10 and node B 12 communicate by sending packets to each other and node C 14 and node D 16 communicate by sending packets to each other.

Figure 2:
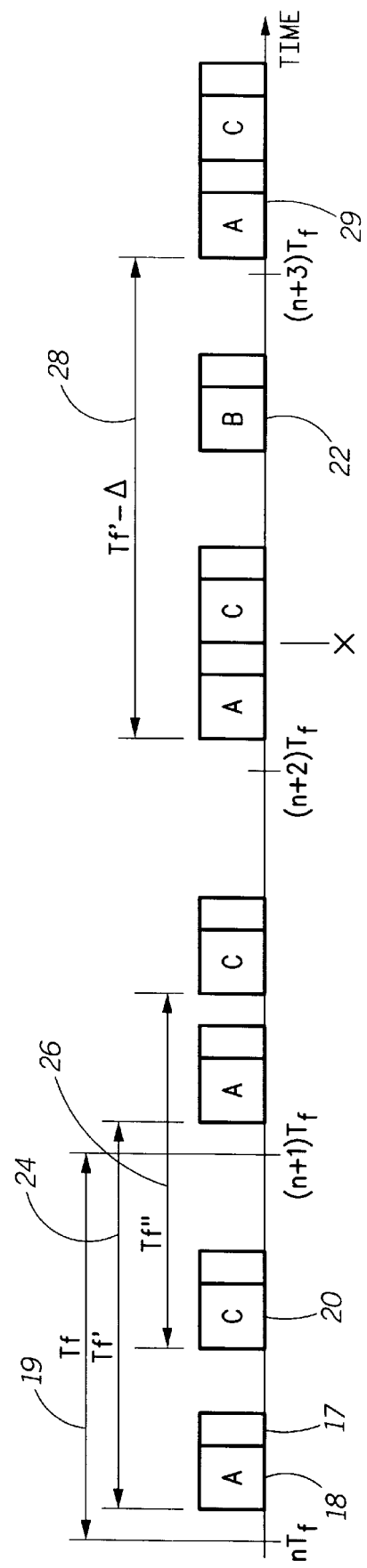
FIGS. 2 and 3 are timing diagrams illustrating operation of the nodes of FIG. 1 according to the preferred embodiment of the invention.
Figure 3:
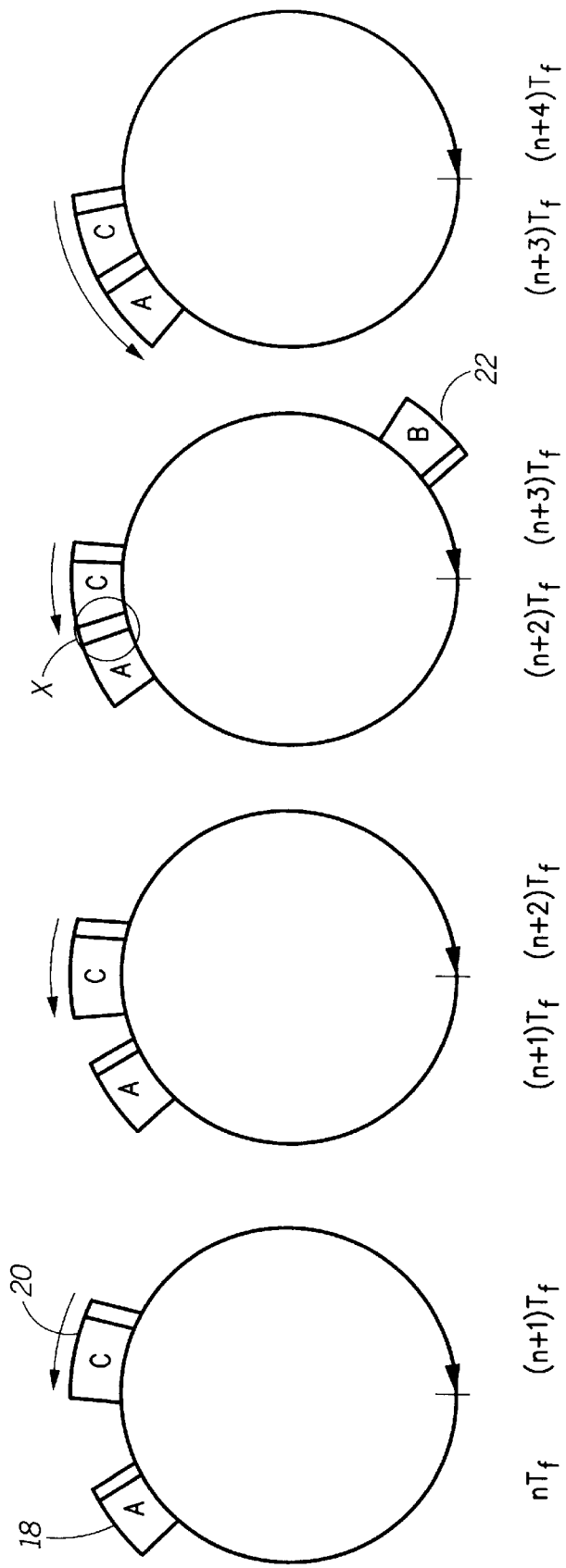

FIGS. 2 and 3 are timing diagrams of FIG. 1 according to the preferred embodiment of the invention. As shown in FIGS. 2 and 3, a predetermined bit pattern (appended field) 17 is appended at the end of each packet. Characteristics of the appended field are bit-errors, signal strength and degree of signal distortion. These characteristics are either observed individually or in any combination. Errors in the appended field can be used to detect at node B an overlap in advance between packets transmitted by nodes A and C (before the cyclic redundancy check (CRC), payload or any other component of the packet is damaged). This information can be used to instruct the transmitter at node A to advance subsequent packets 29 in time, relative to previous packets in previous frames, to eliminate the overlap. The idea is not to create a slotted system (protocol), but rather to shift subsequent packets 29 in time dictated by the difference of clocks in the nodes.

On the other hand, the appended field could instead be a leading field, as opposed to a trailing field, wherein the known bit pattern is appended to the beginning of the packet. The transmitter at node C retards subsequent packets in time after a suspected overlap is detected by node D (or any other observing node) with a packet transmitted from node A. As described, the appended field can either be a leading or a trailing field of a packet. However, the concept wherein the appended field is a trailing field is described below with reference to the accompanying figures.

In FIGS. 2 and 3, node A 10 is sending a periodic stream of packets 18 to node B 12 with a first given frame period $T_f'$ 24 and node C 14 is sending a periodic stream of packet to node D 16 with a second given frame period $T_f''$ 26. The present invention assumes that the time constant $T_f$ 19 represents the ideal frame duration agreed by all nodes in the network. Due to clock inaccuracies, each node will have a clock frequency slightly offset with respect to $1/T_f$. In this particular example, $T_f'$ 24=$T_f$ 19 (i.e., the clock at node A 10 is accurate) and $T_f''$ 26<$T_f$ 19 (the clock at node C 14 is fast). As a result of the clock at node C 14 being fast, packet C 20 transmitted from node C 14 will start "approaching" packet A 18 transmitted from node A 10. After some time, the beginning (preamble) of packet C 20 transmitted from node C 14 overlaps with the appended field of packet A 18 transmitted from node A 10 (discussed in greater detail below in FIG. 4).

It should be noted that the figures are not drawn to scale and that the drift of packet C 20 transmitted from node C 14 occurs much slower than shown. For example, in a worst case scenario with the following values, at 10 mega-bits-per-second (Mbps) signaling rate, 6 milliseconds (msec) frame period and 10 parts-per-million (ppm) clock accuracy, a packet will advance or lag at most 1.2 bits per frame. Explained in more detail, node A 10 and node C 14 transmit packets to node B 12 and node D 16, respectively, at a signaling rate of 10 Mbps, which implies that the bit period is 0.1 microseconds. The duration of the frame period, $T_f$ 19, is equal to 6 msec. The 10 ppm clock accuracy implies that the maximum advance or lag of a packet per frame is 10×6 msec/1,000,000=0.00006 msec. During one frame period, the slower clock can generate the frame length of 6.00006 msec and the faster clock can generate the frame length of 5.99994 msec. The difference between the two is the worst case length of the overlap that can happen during a period of one frame. In this particular example, it is equal to 0.000120 msec=0.12 microseconds. Expressed in bit periods, this is equal to 1.2 bit intervals.

Figure 4:
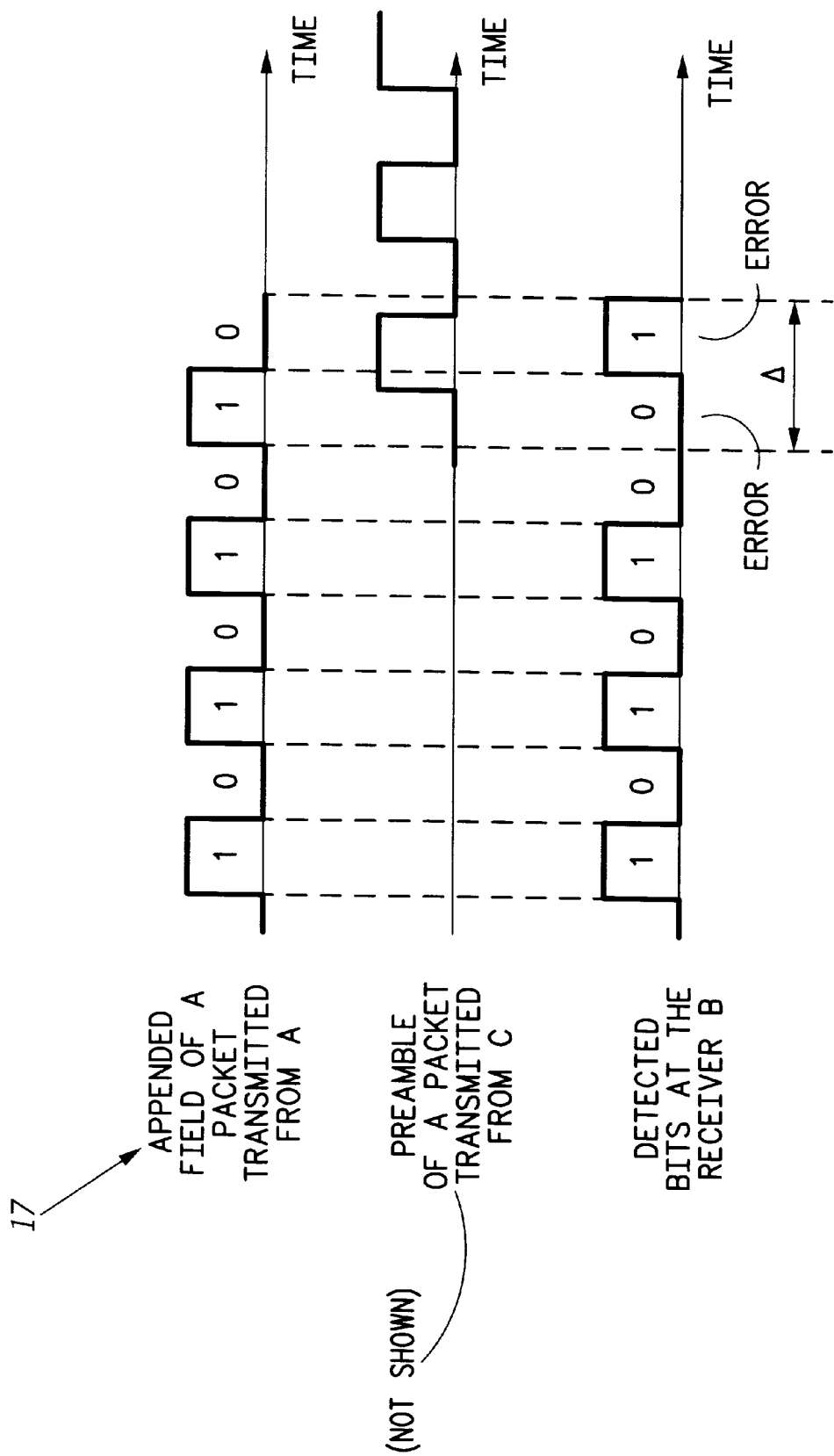
FIG. 4 is a timing diagram of an exploded view X of a packet overlap in FIGS. 2 and 3 according to the preferred embodiment of the invention.

FIG. 4 is a timing diagram of an exploded view X of a packet overlap in FIGS. 2 and 3 according to the preferred embodiment of the invention. As seen pictorially in FIGS. 2 and 3, the beginning (preamble) of packet C collides with the appended field of packet A. After the overlap has started, node B 12 detects the overlap by observing bit-errors in the appended field 17, usually but not necessarily following CRC. Based on the error pattern, node B 12 measures the size of the suspected overlap and sends information back to node A 10 on how to shift its start-of-transmission time. This information needs to be sent in a packet 22 (FIGS. 2 and 3) from node B, or from some other observing node not specified in FIGS. 2–3, to node A 10. Node A 10 receives the packet 22 and reschedules its transmission to send packets to node B 12 to start $(T_f'-\Delta)$ seconds after the beginning of its last transmission, where $\Delta$ is a correction factor. In this particular example, $\Delta$ is equal to the length of the overlap, as denoted in FIG. 4. One possible technique is to apply the correction factor $\Delta$ only when an instruction for such application is received. Another possible technique would be to apply the correction factor multiple times after receiving a single instruction. Note that the packet with the fastest clock (i.e., the smallest $T_f$) acts as a "locomotive", pushing other packets from other nodes with slower clocks to be sent earlier. The same effect can be observed with multiple packets per frame. The overall effect is that packets become clustered, thus freeing up space in the frame for new packets.

It should be pointed out that the way the start of the frame is chosen is completely arbitrary and that each node has its own start-of-frame reference. Also, it is assumed that the nodes have already established connections and are exchanging packets.

In a more complex arrangement, detecting a suspected overlap with the first packet (packet A) and the second packet (packet C), node B or any other observing node measures a size of the suspected overlap. The size of the suspected overlap is based on either the number of bit-errors it the appended field, an increase in signal strength at the appended field, a degree of distortion at the appended field, or any other suitable manner in which to observe and detect a suspected overlap with packets.

The size of the suspected overlap can be measured over a single frame period or the size of the suspected overlap can be measured over a plurality of frame periods, thus estimating a rate of overlap. Thus, the factor $\Delta$ can be specified in packet 22 as a variable factor dependent on such measure.

Figure 5:
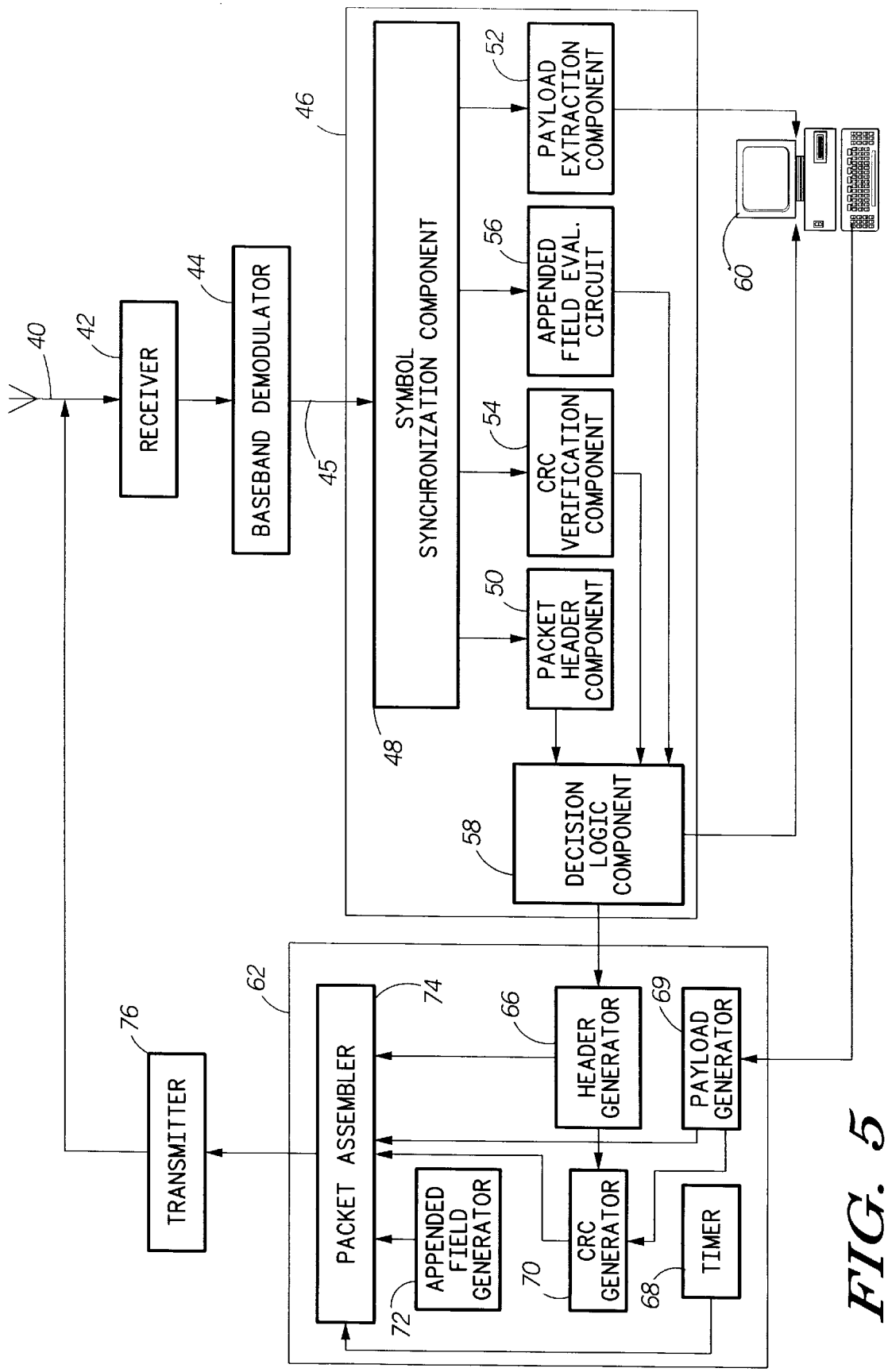
FIG. 5 is a general block diagram of a digital transceiver according to the preferred embodiment of the invention.

FIG. 5 is a general block diagram of a digital transceiver according to the preferred embodiment of the invention. The digital transceiver comprises the following: an antenna 40; a receiver 42 coupled to the antenna 40; a baseband demodulator 44 coupled to the receiver 42; a data recovery module 46 coupled to the baseband demodulator 44; data assembly module 62 coupled to the data recovery module 46 and coupled to an end user 60; and a transmitter 76 coupled to the data assembly module 62 and to the antenna 40.

The baseband demodulator 44 passes a baseband signal 45 to the data recovery module 46. In the case when no error occurs, this baseband signal 45 is a replica of the original modulating signal at a transmitter (not shown) of the transmitting node (not shown).

The data recovery module 46 comprises a symbol synchronization component 48, a packet header component 50, a payload extraction component 52, a CRC verification component 54 (optional), an appended field evaluation circuit 56 and a decision logic component 58. The symbol synchronization component 48 determines the phase of the signal. Knowing the phase of the signal, the signal can be converted into a stream of bits. The stream of bits is distributed to the packet header component 50, the payload extraction component 52, the CRC verification component 54 and the appended field evaluation circuit 56. The packet header component 50 identifies the content of the signal, for example, whether the signal is voice or data, the length of the packet, etc., and shows the structure of the packet information. Thus, based on the information contained in the packet header component 50, the locations of the payload, the CRC and the appended field are easily obtainable.

The payload extraction component 52 and the decision logic component 58 are further coupled to the end user 60. The decision logic component 58 controls the retrieving of the payload extraction component 52, wherein the payload extraction component 52 retrieves the information that is intended for the end user 60. The CRC verification component 54 is the means to inform the end user 60 whether any errors occurred in the transmission. Thus, the CRC verification component 54 checks to see whether the payload is correct or whether the payload contains any errors. Therefore, CRC checking verifies if the payload is error-free.

The data assembly module 62 comprises a payload generator 64, a header generator 66, a timer 68, a CRC generator 70 (optional), an appended field generator 72 and a packet assembler 74. The header generator 66 is coupled to the decision logic component 58 of the data recovery module 46. The payload generator 64 is coupled to the end user 60. The CRC generator 70 is coupled to the payload generator 64 and the header generator 66. The packet assembler 74 is coupled to the timer 68, the CRC generator 70, the appended field generator 72, the header generator 66 and the payload generator 64. The packet assembler 74 is further coupled to the transmitter 76.

As described above in relation to FIGS. 2 and 3, the appended field of a packet transmitted from node A is observed by an appended field evaluation circuit 56 of node B to allow node B to monitor the bit-errors in that appended field. A high number of bit-errors in the appended field is indicative of an overlap. Alternatively or additionally, the appended field evaluation circuit 56 of node B can observe an increase in signal strength indicative of two overlapping signals combining in strength. Further, the appended field evaluation circuit 56 can detect a degree of distortion. An example of such detection would occur in an appended "trailing" field of all "1s" being detected with a component of modulation indicative of the presence of "0s" in a "leading" field from another packet. However, the present invention is neither dependent on any particular bit pattern in the appended field nor dependent on any particular modulation scheme presupposed in this example.

If there is a suspected overlap detected by node B or any other device observing the appended field of node A, the decision logic component 58 at node B passes information to the header generator 66 (which creates the header in packet 22 of FIG. 2) to inform node A to advance (or retard) its timing for subsequent transmitted packets. The packet assembler 74 assembles and transmits the timing packet (packet 22) including a packet header (created in the header generator 66), the payload (created in the payload generator 64), the CRC (created n the CRC generator 70) and the appended field (created in the appended field generator 72). When node A receives the timing packet (packet 22) that was assembled by the packet assembler 74 of node B, node A adjusts its timer 68 by advancing (or retarding) its transmissions of subsequent packets. Such an adjustment will prevent a suspected overlap with another packet and preserve the payload of packet A.

While the invention has been described in conjunction with a specific embodiment thereof, it is evident that many alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. In an ad hoc wireless network in which nodes communicate packets periodically over a plurality of frames of time without a central controller, wherein each node has its own start-of-frame reference and each node can start its transmission of packets at any time in a frame, a method of a self synchronizing network protocol comprising, at a second node, the steps of:

receiving a first packet from a first node at a first transmission time in a first frame period;

observing a characteristic of an appended field of the first packet;

detecting a suspected overlap with the first packet and a second packet transmitted from a third node before a component, other than the appended field, of the first packet is damaged; and sending an instruction to the first node on how to shift start-of-transmission time to be applied to a subsequent packet transmitted from the first node in a subsequent frame period in order to prevent in advance damage to a component, other than the appended field, of subsequent packets transmitted from the third node in subsequent frame periods.

2. The method of claim 1 wherein the characteristic of the appended field of the first packet is bit-errors.

3. The method of claim 1 wherein the characteristic of the appended field of the first packet is signal strength.

4. The method of claim 1 wherein the characteristic of the appended field of the first packet is a degree of signal distortion.

5. The method of claim 1 wherein the characteristic of the appended field of the first packet is a combination of bit-errors and signal strength.

6. The method of claim 1 wherein the characteristic of the appended field of the first packet is a combination of bit-errors and degree of signal distortion.

7. The method of claim 1 wherein the characteristic of the appended field of the first packet is a combination of signal strength and degree of signal distortion.

8. The method of claim 1 wherein the characteristic of the appended field of the first packet is a combination of bit-errors, signal strength and degree of signal distortion.

9. The method of claim 1 wherein the appended field is a trailing field.

10. The method of claim 9 wherein the instruction adjusts the start-of-transmission time as an advancement in time.

11. The method of claim 1 wherein the appended field is a leading field.

12. The method of claim 11 wherein the instruction adjusts the start-of-transmission time as a retardation in time.

13. The method of claim 1 wherein the appended field comprises a known bit pattern.

14. The method of claim 1 wherein the step of sending an instruction to the first node on how to shift start-of transmission time is applied to a plurality of subsequent packets transmitted from the first node in subsequent frame periods.

15. In an ad hoc wireless network in which nodes communicate packets periodically over a plurality of frames of time without a central controller, wherein each node has its own start-of-frame reference and each node can start its transmission of packets at any time in a frame, a method of a self synchronizing network protocol comprising the steps of:

transmitting a packet, having an appended field, to a first node at a first transmission time in a first frame period;

experiencing a suspected overlap in the appended field with another packet transmitted from another node;

receiving an instruction from the first node to shift start-of-transmission time of a subsequent packet by delta after a start of a last transmission in order to prevent an overlap in the subsequent packet; and transmitting the subsequent packet to the first node at a second transmission time in a second frame period, wherein the first frame period is equal to the second frame period and a time interval between the first transmission time in the first frame period and the second transmission time in the second frame period is shorter than the first frame period.

16. In an ad hoc wireless network in which nodes communicate packets periodically over a plurality of frames of time without a central controller, wherein each node has its own start-of-frame reference and each node can start its transmission of packets at any time in a frame, a method of a self synchronizing network protocol comprising the steps of:

transmitting a packet, having an appended field, to a first node at a first transmission time in a first frame period;

experiencing a suspected overlap in the appended field with another packet transmitted from another node;

receiving an instruction from the first node to shift start-of-transmission time of a subsequent packet by delta after a start of a last transmission in order to prevent an overlap in the subsequent packet; and transmitting the subsequent packet to the first node at a second transmission time in a second frame period, wherein the first frame period is equal to the second frame period and a time interval between the first transmission time in the first frame period and the second transmission time in the second frame period is longer than the first frame period.

17. In an ad hoc wireless network in which nodes communicate packets periodically over a plurality of frames of time without a central controller, wherein each node has its own start-of-frame reference and each node can start its transmission of packets at any time in a frame, a method of a self-synchronizing network protocol comprising, at a second node, the steps of:

receiving a first packet from a first node at a first transmission time in a first frame period;

observing a characteristic of an appended field of the first packet;

detecting a suspected overlap with the first packet and a second packet transmitted from a third node before a component, other than the appended field, of the first packet is damaged;

measuring a size of the suspected overlap; and sending an instruction to the first node on how to shift start-of-transmission time to be applied to a subsequent packet transmitted from the first node in a subsequent frame period in order to prevent in advance damage to a component, other than the appended field, of subsequent packets transmitted from the third node in subsequent frame periods.

18. The method of claim 17 wherein the size of the suspected overlap is measured over a single frame period.

19. The method of claim 17 wherein the size of the suspected overlap is measured over a plurality of frame periods, thus estimating a rate of overlap.

20. In an ad hoc wireless network in which nodes communicate packets periodically over a plurality of frames of time without a central controller, wherein each node has its own start-of-frame reference and each node can start its transmission of packets at any time in a frame, a method of a self synchronizing network protocol comprising the steps of:

at a second node:
receiving a first packet from a first node in a first frame period;
observing an appended field of the first packet in response to the step of receiving;
detecting a suspected overlap between the first packet and a second packet transmitted from a third node, as a result of the step of observing;
instructing the first node to adjust a start-of-transmission time of a further packet;

at the first node:
adjusting the start-of-transmission time of the further packet relative to a start-of-transmission time of the first packet in the first frame period;
transmitting the further packet at an adjusted start-of-transmission time in a second frame period; and at the second node:
receiving the further packet in the second frame period with the adjusted start-of-transmission time.

21. The method of claim 20 wherein the appended field is a trailing field.

22. The method of claim 21 wherein the adjusted start-of-transmission time is an advancement in time.

23. The method of claim 20 wherein the appended field is a leading field.

24. The method of claim 23 wherein the adjusted start-of-transmission time is a retardation in time.

25. The method of claim 20 wherein the appended field comprises a known bit pattern.

26. The method of claim 20 wherein the step of adjusting the start-of-transmission time is applied to a plurality of further packets.

27. In an ad hoc wireless network in which nodes communicate packets periodically over a plurality of frames of time without a central controller, wherein each node has its own start-of-frame reference and each node can start its transmission of packets at any time in a frame, a method of a self synchronizing network protocol comprising the steps of:

transmitting a packet, having an appended field, to a first node at a first transmission time in a first frame period;

experiencing a suspected overlap in the appended field with another packet transmitted from another node;

receiving an instruction from the first node to shift start-of-transmission time of a subsequent packet by delta after a start of a last transmission in order to prevent an overlap in the subsequent packet; and transmitting the subsequent packet to the first node at a second transmission time in a second frame period.

28. In an ad hoc wireless network in which nodes communicate packets periodically over a plurality of frames of time without a central controller, wherein each node has its own start-of-frame reference and each node can start its transmission of packets at any time in a frame, a system comprising:

a receiver for receiving a first packet from a first node at a first transmission time in a first frame period;

a baseband demodulator coupled to the receiver; and a data recovery module, coupled to the baseband demodulator, having a symbol synchronization component, a payload extraction component, a packet header component, an appended field evaluation circuit and a decision logic component, wherein the data recovery module performs, when operational, the following functions:

observes a characteristic of an appended field of the first packet;

detects a suspected overlap with the first packet and a second packet from a third node before a component, other than the appended field, of the first packet is damaged; and sends an instruction to the first node on how to shift start-of-transmission time to be applied to a subsequent packet transmitted from the first node in a subsequent frame period in order to prevent in advance damage to components, other than the appended field, to subsequent packets transmitted from the third node in subsequent frame periods.

29. In an ad hoc wireless network in which nodes communicate packets periodically over a plurality of frames of time, a method of a self synchronizing network protocol comprising the steps of:

at a second node:

receiving a first packet from a first node in a first frame period;

observing an appended field of the first packet in response to the step of receiving;

detecting a suspected overlap between the first packet and a second packet transmitted from a third node as a result of the step of observing;

measuring a size of the suspected overlap between the first packet and the second packet, and wherein the step of instructing is based on the size of the suspected overlap between the first packet and the second packet;

instructing the first node to adjust a start-of-transmission time of a further packet;

at the first node:

adjusting the start-of-transmission time of the further packet relative to a start-of-transmission time of the first packet in the first frame period;

transmitting the further packet at an adjusted start-of-transmission time in a second frame period; and at the second node:

receiving the further packet in the second frame period with the adjusted start-of-transmission time.

30. The method of claim 29 wherein the step of measuring occurs over a single frame period.

31. The method of claim 29 wherein the step of measuring occurs over a plurality of frame periods.

* * * * *